US010379566B2

(12) United States Patent
Acar et al.

(10) Patent No.: US 10,379,566 B2
(45) Date of Patent: Aug. 13, 2019

(54) APPARATUS AND METHOD FOR HIGH VOLTAGE BANDGAP TYPE REFERENCE CIRCUIT WITH FLEXIBLE OUTPUT SETTING

(71) Applicant: Apple Inc., Cupertino, CA (US)

(72) Inventors: Turev Acar, Istanbul (TR); Selcuk Talay, Istanbul (TR); Burak Dundar, Istanbul (TR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/938,306

(22) Filed: Nov. 11, 2015

(65) Prior Publication Data

US 2017/0131736 A1 May 11, 2017

(51) Int. Cl.
*G05F 3/26* (2006.01)
*H02M 1/36* (2007.01)

(52) U.S. Cl.
CPC .............. *G05F 3/267* (2013.01); *H02M 1/36* (2013.01)

(58) Field of Classification Search
CPC ............... G05F 3/20; G05F 3/26; G05F 3/267
See application file for complete search history.

(56) References Cited

U.S. PATENT DOCUMENTS 5,666,046 A 9/1997 Mietus
5,831,474 A * 11/1998 Thiel V .................... G05F 3/30 323/315
6,157,245 A * 12/2000 Rincon-Mora ........... G05F 3/30 327/513
6,366,071 B1 4/2002 Yu
6,563,371 B2 5/2003 Buckley, III et al.
6,677,808 B1 1/2004 Sean et al.
6,819,093 B1 * 11/2004 Kay ........................ G05F 3/267 323/315
8,278,994 B2 10/2012 Kung et al.
8,547,165 B1 10/2013 Bemardinis
2003/0020535 A1 * 1/2003 Young ..................... G05F 3/267 327/538
2004/0036460 A1 * 2/2004 Chatal ..................... G05F 3/267 323/313
2008/0042737 A1 * 2/2008 Kim .......................... G05F 3/30 327/539
2008/0048634 A1 2/2008 Kotchkine et al.
(Continued)

OTHER PUBLICATIONS

German Search Report, File No. 10 2015 224 097.5, Applicant: Dialog Semiconductor (UK) Limited, dated Apr. 6, 2016, 10 pgs, and English Language Translation, 12 pgs.
(Continued)

*Primary Examiner* — Fred E Finch, III
(74) *Attorney, Agent, or Firm* — Meyertons, Hood, Kivlin, Kowert & Goetzel, P.C.

(57) ABSTRACT

An apparatus and method for a voltage reference circuit with flexible and adjustable voltage settings. A voltage reference circuit, comprising a PTAT Current Generator configured to provide current through a first resistor, a CTAT Current Generator configured to provide a CTAT current through a second resistor, a PTAT-CTAT Adder circuit configured to sum the PTAT current, and the CTAT current, wherein said sum of the PTAT and CTAT current through a third resistor is configured to provide an output voltage greater than a silicon bandgap voltage.

16 Claims, 10 Drawing Sheets

(56) References Cited

U.S. PATENT DOCUMENTS

| | | | | |
|---|---|---|---|---|
| 2010/0164602 | A1 | 7/2010 | Im | |
| 2011/0140769 | A1 | 6/2011 | Visconti et al. | |
| 2012/0075007 | A1* | 3/2012 | Watanabe | G05F 3/262 327/534 |
| 2014/0002052 | A1 | 1/2014 | Schaffer | |
| 2014/0077789 | A1* | 3/2014 | Hu | G05F 3/30 323/313 |
| 2016/0357213 | A1* | 12/2016 | Fort | G05F 3/30 |

OTHER PUBLICATIONS

"Curvature-Compensated BiCMOS Bandgap with 1-V Supply Voltage," by Piero Malcovati et al., IEEE Journal of Solid-State Circuits, vol. 36, No. 7, Jul. 2001, pp. 1076-1081.
"Reference Voltage Driver for Low-Voltage CMOS A/D Converters," by Mikko Waltari et al., The 7th IEEE International Conference on Electronics, Circuits and Systems, 2000. ICECS 2000, Dec. 17, 2000, pp. 28-31.
"A CMOS Bandgap Reference Circuit with Sub-1-V Operation," by Hironori Banba et al., IEEE Journal of Solid-State Circuits, vol. 34, No. 5, May 1999, pp. 670-674.

* cited by examiner

APPARATUS AND METHOD FOR HIGH VOLTAGE BANDGAP TYPE REFERENCE CIRCUIT WITH FLEXIBLE OUTPUT SETTING

BACKGROUND

Field

The disclosure relates generally to a bandgap voltage reference circuit and, more particularly, to a voltage reference circuit device with a flexible output setting, over a range of high voltage supply rails.

Description of the Related Art

Voltage reference circuits are a type of circuit used in conjunction with semiconductor devices, integrated circuits (IC), and other applications. Voltage reference circuits can be classified into different categories. A category of voltage reference circuits are known as bandgap reference circuits. The input supply voltage levels change widely depending on the application in portable devices. For example, the supply voltage can be as high as 26V for notebooks, whereas in netbooks or tablets, the supply voltage is around 12V and in handheld devices it is generally 5V. Whatever the supply voltage level is, there is always a need for a fixed reference voltage. This reference voltage is generally very accurate (e.g. the bandgap voltage) and used all over the circuit where accurate reference needed regardless of the supply levels.

Power management circuits in particular are special cases since they also deliver the supply voltages and currents to the rest of the circuits in portable devices. During their operation, after supply voltages settle down, power management circuits also use reference voltage levels for various purposes similar to other type of circuits. However, during startup, since there is no regulated supply voltage available, a special type of circuit which generates the reference voltage has to be used. These blocks generally addressed as "crude bandgap" circuit blocks. As the name of the circuit implies, the goal is to provide a crude reference voltage during startup phase since accurate levels are not needed during that stage of operation. In summary, output of this reference circuit needs to be just accurate enough to start the circuit properly but at the same time it must prevent any breakdown voltage limitation for the transistors.

The current practice is to generate the proportional to absolute temperature (PTAT) current across a resistor with differential in the base-emitter voltage ($\Delta V_{BE}$) of two bipolar junction transistors (BJTs) with different emitter areas. For the PTAT generation, $\Delta V_{BE}$ of two BJTs with an emitter area ratio of A is $$\Delta V_{BE} = \frac{kT}{q}\ln(A).$$

As a result, the same current through another resistor and also a diode connected BJT generates a reference voltage, which is equal to the bandgap voltage of the silicon. For this purpose, the complementary to absolute temperature (CTAT) dependence of a base-emitter voltage to temperature is used as $$V_{BE}(T, I_C) = \frac{kT}{q}\log\left(\frac{I_C}{I_S(T)}\right).$$

In practical integrated circuits, $V_{BE}$ changes inversely proportional to temperature at roughly −2.2 mV/C, and KT/q is PTAT that has a temperature coefficient around +0.085 mV/C.

FIG. 1 illustrates a topology known to the inventors of a bandgap generator circuit 100 between voltage VDD 101 and ground VSS 102. The circuit 100 comprises a startup block 105 coupled to npn bipolar junction transistor (BJT) current mirror 120 with transistor Q1 125A of size A and transistor 125B of size xA. The current mirror 120 is coupled to resistor R1 127. The current mirror 120 is coupled to p-channel MOSFET current mirror M1 115A and M2 115B. The drain of M2 115B is coupled to the gate of p-channel MOSFET M2 130. Diode-connected BJT Q3 140 is coupled to resistor R2 145. The PTAT current is formed via $R_1$ 127 and is then copied over to $R_2$ 145. The combination of voltage over R2 145 and $V_{BE}$ of $Q_3$ 140 provides the reference voltage. Since $V_{BE}$ has a negative temperature coefficient and $V_{R2}$ has a positive temperature coefficient the resulting effect is temperature independent. This reference voltage is equal to a silicon bandgap voltage.

The primary object of this methodology is to provide a reference voltage set to a fixed value equal to a silicon bandgap voltage. The drawback of this implementation is the silicon bandgap voltage is different from the desired reference voltages. In addition, the PTAT current across a diode-connected bipolar transistor is not a pure linear CTAT reference; there is a logarithmic temperature dependency which introduces circuit design challenges. The disadvantages of this implementation to achieve a voltage reference circuit includes a fixed non-adjustable bandgap reference and startup issues.

U.S. Patent Application 2014/002052 to Schaffer et al describes a circuit with an element with a negative temperature coefficient, and a second element with a positive temperature coefficient which are combined to produce a temperature coefficient. This application provides an inherently accurate adjustable switched capacitor voltage reference.

U.S. Pat. No. 8,547,165 to Bernardinis describes a method and system for a voltage reference produced from a PTAT, CTAT, and nonlinear current components generated in isolation of each other and combined to create the voltage reference. This is an adjustable second order compensation bandgap reference.

U.S. Pat. No. 8,278,994 to Kung et al shows a temperature independent reference circuit with a first and second bipolar transistor with commonly coupled bases with a first and second resistor.

U.S. Pat. No. 6,677,808 to Sean et al describes a voltage reference utilizing CMOS parasitic bipolar transistors where the transistors are coupled configured to generate a ΔVbe and Vbe/R, and a resistor divider, to provide an adjustable temperature compensated reference signal.

U.S. Pat. No. 6,563,371 to Buckley III describes a current bandgap voltage reference with a first current source to generate a positive temperature coefficient, PTC, and a second current source to generate a negative temperature coefficient, NTC, to produce a temperature invariant reference voltage.

In the previously published article, "A CMOS Bandgap Reference Circuit with Sub-1V Operation," IEEE Journal of Solid-State Circuit, Volume SC-34, No. 34, May 1999, pp. 670-674, a voltage reference circuit is discussed that operates at a sub-1V voltage level.

In the previously published article "Curvature-compensated BiCMOS Bandgap with 1V Supply Voltage," Solid-State Circuit, 2001, describes a 1V BiCMOS circuit.

In the previously published article "Reference Voltage Driver for Low-Voltage CMOS A/D Converter," Proceedings of the ICECS 2000, Vol. 1, 2000, pp. 28-31 describes an analog-to-digital converter.

In these prior art embodiments, the solution to improve the operability of a low voltage bandgap reference circuit utilized various alternative solutions.

It is desirable to provide a solution to address the disadvantages of operation of a fixed voltage bandgap voltage reference circuit.

SUMMARY

A principal object of the present disclosure is to provide a crude bandgap voltage reference circuit which allows for operation of a circuit that utilizes PTAT and CTAT currents.

Another object of the present disclosure is to provide a bandgap voltage reference circuit which allows for a freely adjustable bandgap voltage reference whose operation of a circuit utilizes PTAT and CTAT currents.

A further object of the present disclosure is to provide a bandgap voltage reference circuit which allows for high supply voltages.

Another object of the present disclosure is to provide a bandgap voltage reference circuit with a startup network that can operate at high supply voltages and avoids start-up problems.

Another further object of the present disclosure is to provide a bandgap voltage reference circuit with a startup function in a freely adjustable reference voltage that avoids noise transients, glitches, and false triggering.

A still further object of the present disclosure is to provide a bandgap voltage reference circuit whose startup network in a freely adjustable reference voltage that avoids false triggering of the comparator circuit blocks.

Another further object of the present disclosure is to provide a freely adjustable voltage reference circuit that maintain accuracy.

The above and other objects are achieved by a voltage reference circuit, having a PTAT Current Generator configured to provide current through a first resistor, a CTAT Current Generator configured to provide a CTAT current through a second resistor, a PTAT-CTAT Adder circuit configured to sum the PTAT current, and the CTAT current, wherein the sum of the PTAT and CTAT current through a third resistor is configured to provide an output voltage greater than a silicon bandgap voltage.

These objects are further achieved by a startup circuit for initiation of a voltage reference circuit, including a first n-channel MOSFET current mirror configured to provide a current source, a first p-channel MOSFET current mirror configured to provide a current source, a second p-channel MOSFET current mirror electrically coupled to the first p-channel MOSFET current mirror, a second n-channel MOSFET coupled to npn bipolar junction transistor (BJT) current mirror, first and second resistors coupled to the p-channel MOFSET current mirror, and a first diode-connected element and the npn bipolar junction transistor (BJT) current mirror electrically coupled to the second p-channel MOSFET current mirror and a resistor.

In addition, the above objects are achieved by a method of initiating a voltage reference circuit, which includes providing a voltage reference circuit, supplying current through a resistor, setting a first current reference through the resistor, mirroring the first reference current to a first MOSFET pair; and a second MOSFET pair, to start up the voltage reference circuit, mirroring a second reference current to a third MOSFET pair from the voltage reference circuit, copying the second reference current to a MOSFET transistor, and, disabling the startup circuit.

The above objects are further achieved by a method of providing a reference voltage, which includes providing a PTAT current through a resistor, providing a CTAT current through a second resistor, summing the PTAT and CTAT currents to create a summed PTAT/CTAT current, and providing an output voltage greater than a silicon bandgap voltage by passing the summed PTAT/CTAT current through a third resistor.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 1:
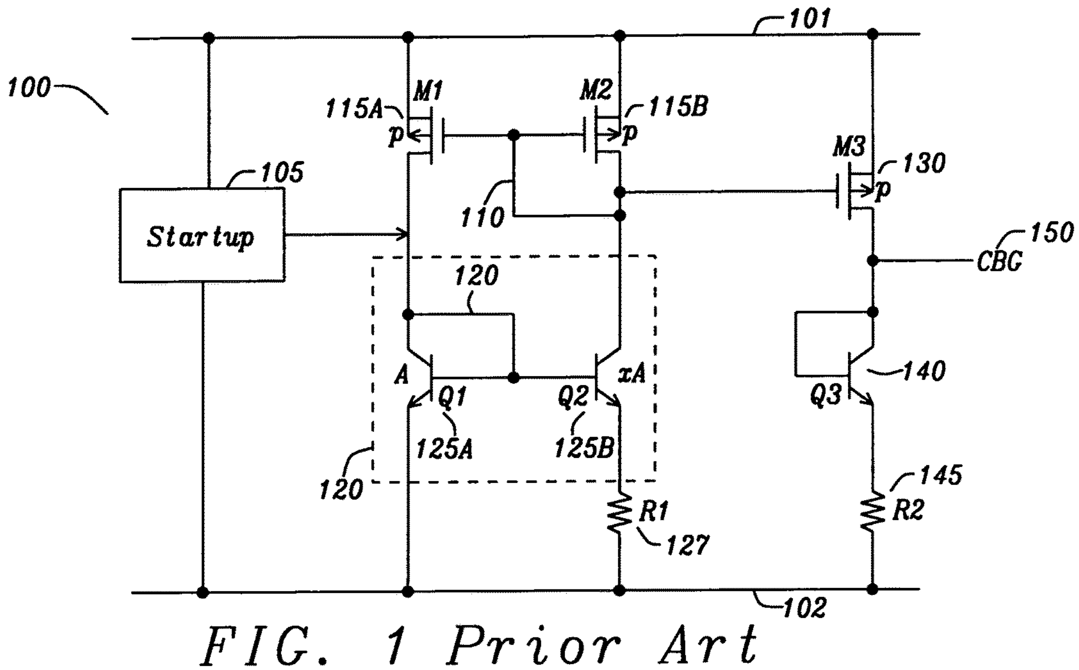
FIG. 1 Prior Art
FIG. 1 is a topology schematic of a bandgap voltage reference circuit known to the inventors.
Figure 2:
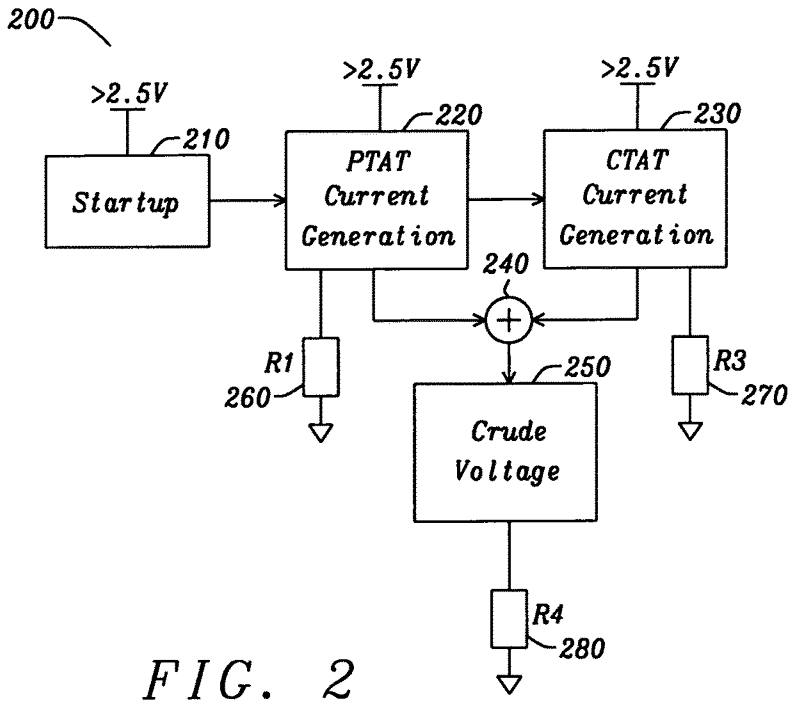
FIG. 2 is a high-level circuit schematic of a voltage reference circuit in accordance with a first embodiment of the disclosure.

FIG. 2 is a high-level circuit schematic of a voltage reference circuit in accordance with a first embodiment of the disclosure. FIG. 2 illustrates the circuit 200 of a voltage reference network comprises a startup block 210, a PTAT Current Generation block 220, a CTAT Current Generation block 230, an adder block 240, and a reference voltage block 250. A crude reference voltage 250 using PTAT and CTAT currents are summed such that their temperature coefficients compensate each other. The sum of the PTAT and CTAT currents is constant with respect to temperature. Over a wide temperature range, the behavior of this circuit is stable enough to adequately supply reference voltage levels to the other circuits. Therefore, additional circuitry is required to generate the desired reference voltages that are different from this reference voltage. Resistor R1 260 is coupled to the PTAT Current Generation block 220. Resistor R3 270 is coupled to CTAT Current Generation block 230. Resistor R4 280 is coupled to the reference voltage block 250. Resistor R4 280 can be a programmable resistor.

Figure 3:
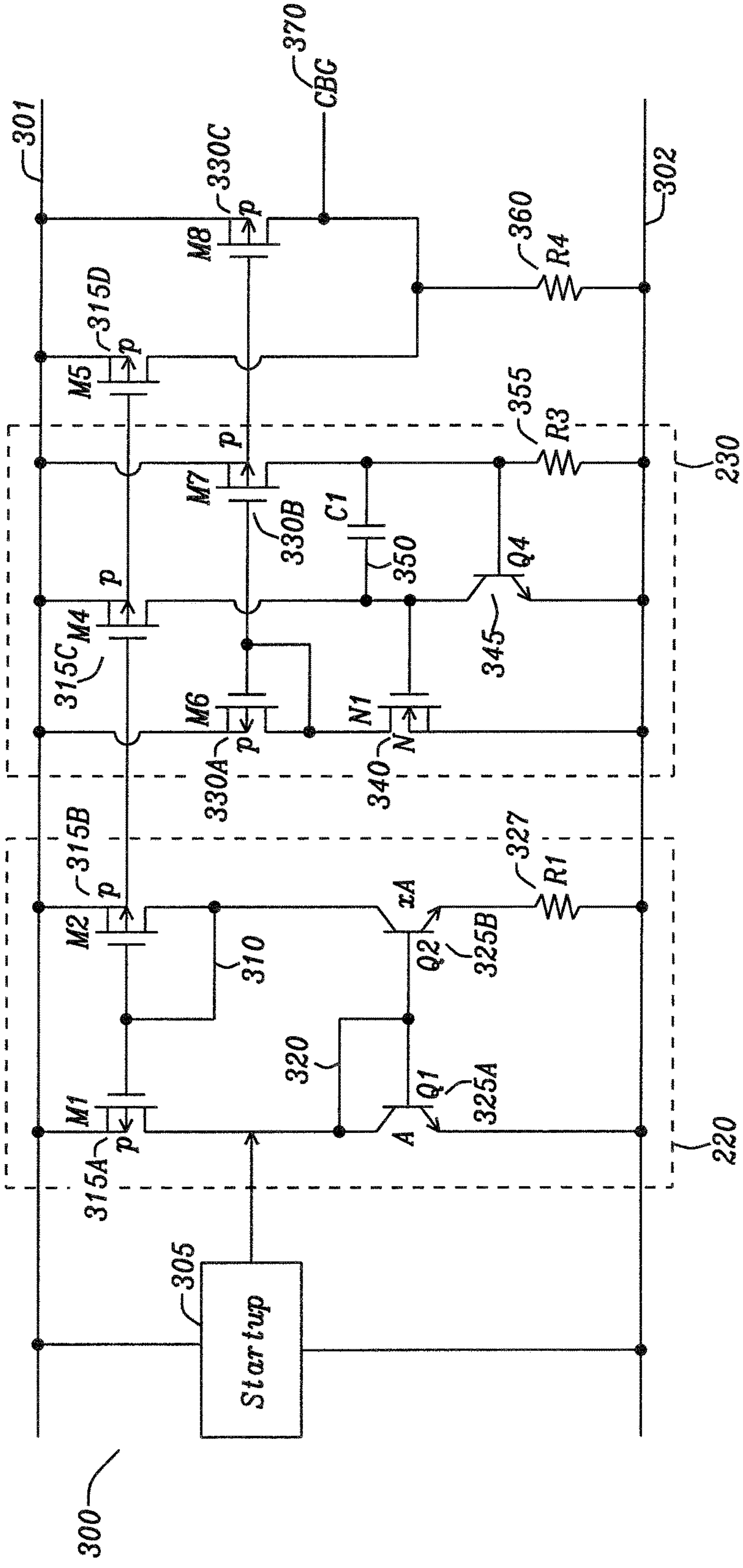
FIG. 3 is a circuit schematic of a bandgap voltage reference circuit in accordance with a first embodiment of the disclosure.

FIG. 3 is a circuit schematic 300 of a voltage reference circuit in accordance with a first embodiment of the disclosure. The circuit comprises a power supply rail VDD 301, and ground VSS rail 302. A PTAT Current Generation block 220 is coupled to power supply rail VDD 301. A CTAT Current Generation block 230 is coupled to power supply VDD 301. The startup circuit 305 couples into the bandgap circuit. The circuit 300 comprises a startup block 305 coupled to npn bipolar junction transistor (BJT) current mirror 320 with transistor Q1 325A of size A and transistor 325B of size xA. The current mirror 320 is coupled to resistor R1 327. The current mirror 320 is coupled to p-channel MOSFET current mirror M1 315A and M2 315B. The drain of M2 315B is coupled to the gate of p-channel MOSFET M4 315C and p-channel MOSFET M5 315D. A second p-channel based mirror is formed from p-channel MOSFET M6 330A and M7 330B and M8 330C. An n-channel MOSFET N1 340 is coupled to the transistor M6 330A. A npn bipolar transistor Q4 345 is coupled to the gate of N1 340, and comprises a collector capacitor C1 350 and base resistor R3 355. The output of the circuit comprises a resistor R4 360, and output signal CBG 370. This circuit comprises (a) generation of reference voltage via PTAT and CTAT currents, and resistors, (b) generation of freely adjustable reference voltage via PTAT and CTAT currents, (c) generation of freely adjustable reference voltage with high supply voltages, (d) a start-up circuit that can work with high supply voltages and avoids non-startup problem, (e) a smooth startup of freely adjustable reference voltage to avoid any glitches or undesired triggering of comparators, and (f) generation of more accurate and freely adjustable reference voltage than the conventional crude bandgaps at startup phase. The advantages of this embodiment are that it allows flexible setting of output reference voltage and its output resistances with better accuracy then conventional voltage references, operates with high supply voltages, a competitive DC and AC accuracy under power-supply variations, compared to common crude bandgap reference generators, no trimming is required, and a smooth startup that avoids any transient response at reference ready comparator. Generation principles of PTAT and CTAT currents are distinct from prior art, by instead of generating output voltage on the diode which is the main source of output voltage limitation (silicon bandgap voltage), in this embodiment PTAT and CTAT currents are extracted and summed on a separate resistor to obtain a flexible and crude voltage reference. In FIG. 3, PTAT current has been formed over resistor R1 327. Then via $R_3$ 355 CTAT current is generated. Through M5 315D and M8 330C PTAT and CTAT currents are copied again and summed on resistor R4 360. This voltage gives us the adjustable reference voltage. Resistor ratios define the output voltage and hence a wide range of reference voltage value can be created with this approach. In this embodiment, independent design variables, such as R1 327 and $R_3$ 355 freely define the reference voltage.

Figure 4:
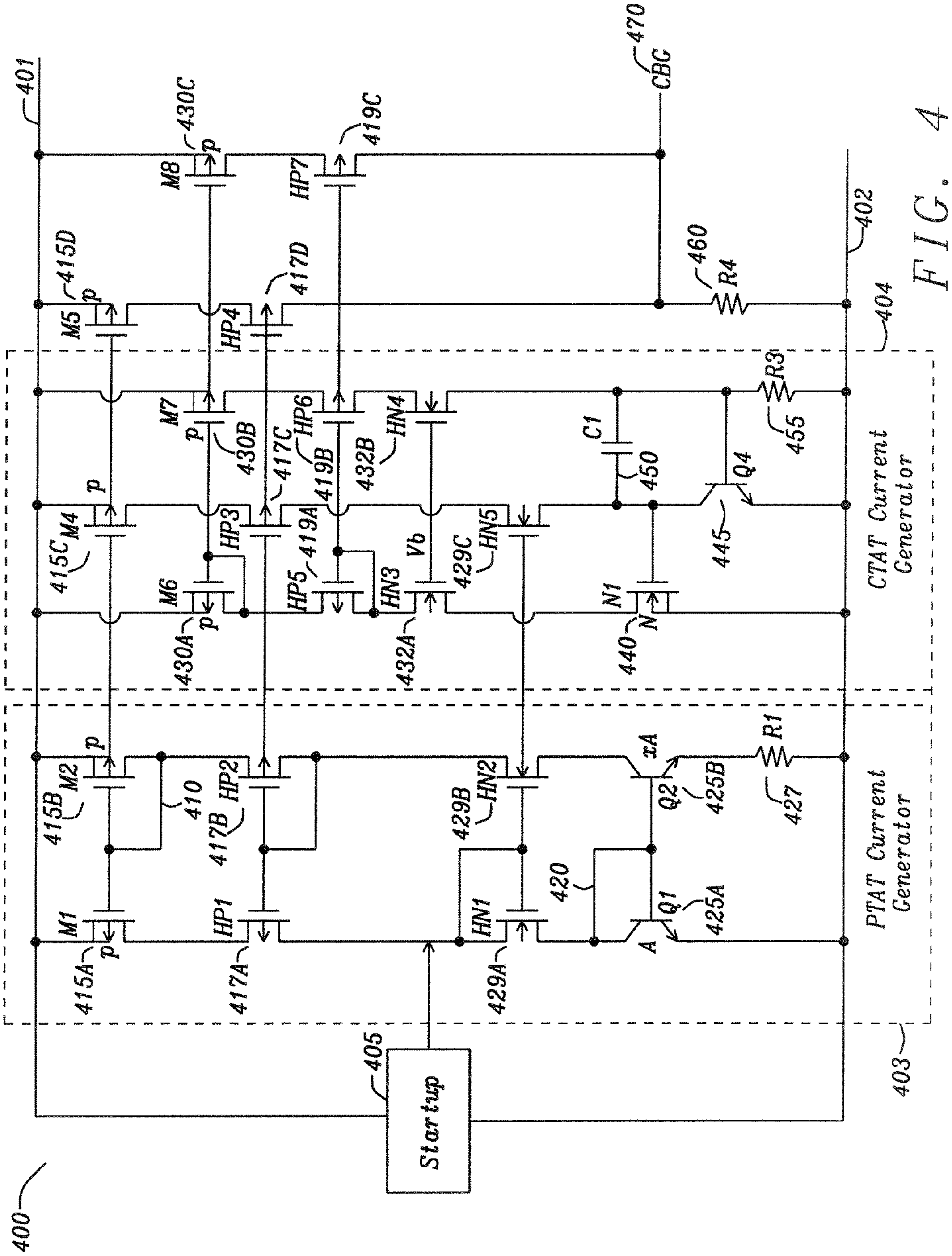
FIG. 4 is a circuit schematic of a bandgap voltage reference circuit in accordance with a second embodiment of the disclosure.

FIG. 4 is a circuit schematic of a voltage reference circuit in accordance with a second embodiment of the disclosure. The voltage reference 400 operates at higher supply voltages by further utilization of protection elements high voltage n-channel (HN) transistors and high voltage p-channel (HP) transistors. The circuit 400 comprises a power supply rail VDD 401, and ground VSS rail 402. The circuit 400 comprises a PTAT Current Generator 403, a CTAT Current Generator 404, and startup circuit 405 blocks. The startup circuit 405 couples into the PTAT generation circuit. The PTAT Current Generator comprises npn bipolar junction transistor (BJT) current mirror 420 with transistor Q1 425A of size A and transistor 425B of size xA. The current mirror 420 is coupled to resistor R1 427. A high voltage stage forming a current mirror comprises of a p-channel MOSFET HN1 429A and HN2 429B. A second high voltage stage forming a current mirror of a p-channel MOSFET HP1 417A and 417B. This current mirror formed by 417A and 417B is coupled to p-channel MOSFET current mirror M1 415A and M2 415B. This current mirror 417A/417B is coupled HP3 417C and HP4 417D. The drain of M2 415B is coupled to the gate of p-channel MOSFET M4 415C and p-channel MOSFET M5 415D. Within CTAT Current Generator 404, a p-channel based mirror is formed from p-channel MOSFET M6 430A and M7 430B and M8 430C. Within CTAT Current Generator 404, a high voltage stage forms a current mirror HP5 419A, and HP6 419C is coupled to HP7 419C. This stage is coupled to high voltage stage n-channel HN3 432A and HN4 432B. A high voltage transistor HN5 429C of the CTAT Current Generator 404 is electrically coupled to an n-channel MOSFET N1 440 and a npn bipolar transistor Q4 445 is coupled to the gate of N1 440, and comprises a collector capacitor C1 450 and base resistor R3 455. The output of the circuit comprises a resistor R4 460, and output signal CBG 470. The operation is same with the method of using resistors, (R1, R3 and R4) the freely adjustable reference voltage can be achieved. The main improvement here is the addition of protection devices, which increases the supply voltage value that this invention can operate safely. Again PTAT and CTAT currents are separately generated so they can be adjusted as desired. One important design parameter here is to take care of the slopes properly which gives constant term when PTAT and CTAT currents are summed up.

Figure 5:
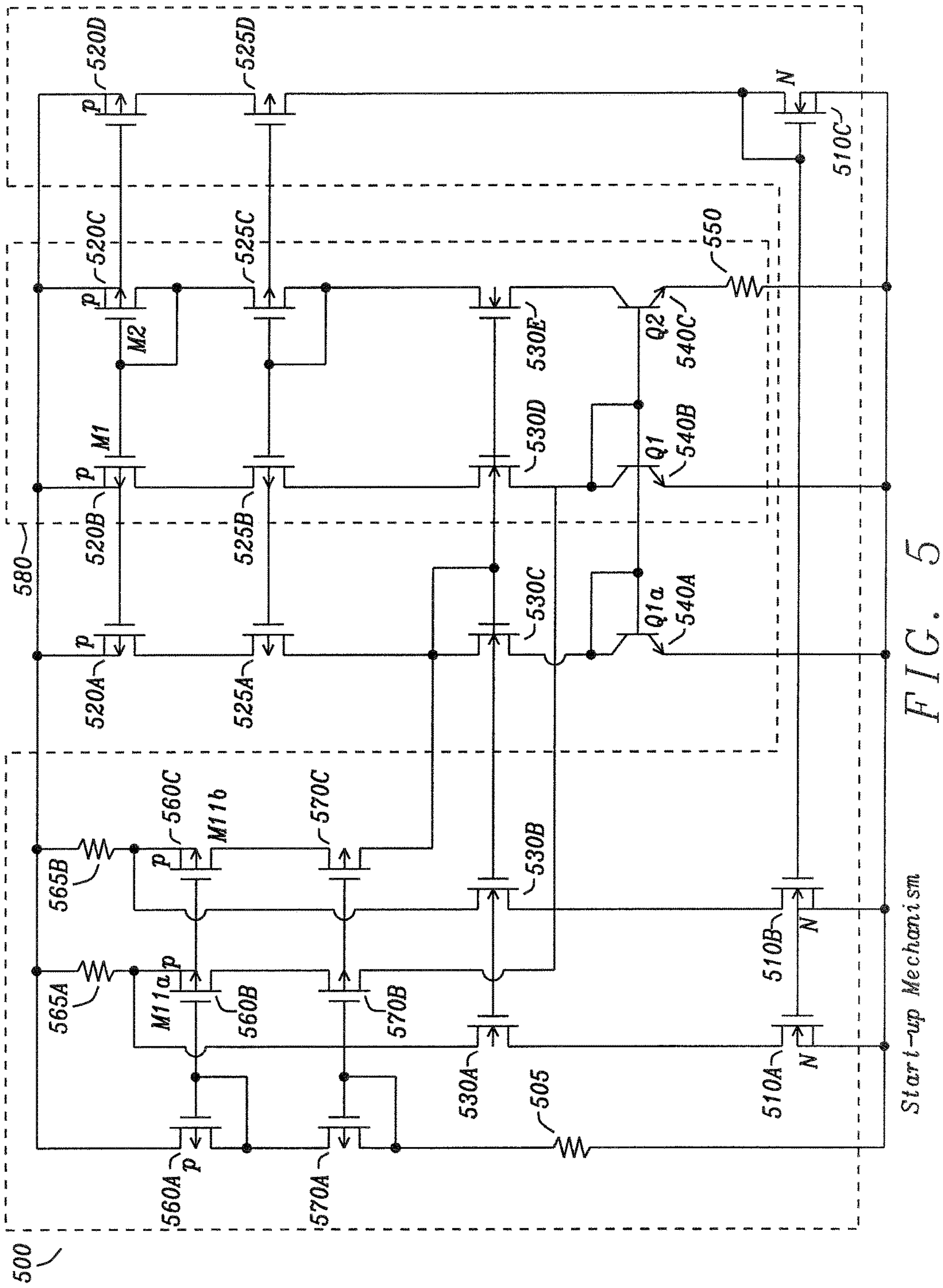
FIG. 5 is a circuit schematic of a startup circuit block of a bandgap voltage reference circuit in accordance with an embodiment of the disclosure.

FIG. 5 is a circuit schematic of a startup circuit block of a bandgap voltage reference circuit in accordance with an embodiment of the disclosure. The startup circuit 500 comprises a n-channel MOSFET current mirror with n-channel MOSFET 510A, 510B, and 510C. The startup network 500 comprises a resistor element 505. The startup circuit 500 comprises a p-channel MOSFET current mirror formed with 520A, M1 520B, M2 520C, and 520D. Electrically coupled to the p-channel MOSFET current mirror is a second p-channel MOSFET current mirror formed with 525A, 525B, 525C, and 525D. Additionally, an n-channel MOSFET current mirror 530A, 53B, 530C, 530D, and 530E; this current mirror is coupled to npn bipolar current mirror. The npn bipolar junction transistor (BJT) has a first diode-connected element Q1*a* 540A, and BJT current mirror formed from BJT Q1 540B, and BJT Q2 540C electrically coupled to a resistor 550. The startup network 500 also comprises an additional p-channel current mirror 560A, 560B, and 560C coupled to resistors 565A and 565B coupled to p-channel MOSFET current mirror 570A, 570B, and 570C. This startup circuit 500 allows for high voltage operation. This startup network allows for initiating startup of the bandgap voltage reference network and then shuts down once the bandgap voltage reference network establishes a reference voltage. The startup circuit 500 operates continuously sensing the current through the bipolar junction transistor (BJT) structures 540A, 540B, and 540C When there is current, the resistors and DC levels cuts off the startup transistors minimizing the quiescent current. However, if the device falls back to startup condition, since the operation is continuous, the startup circuit 500 becomes reactivated and starts up the bandgap reference circuit. This approach avoids deadlocks that may end up without startup of the bandgap voltage reference. Also the startup circuit 500, similar to the bandgap voltage reference circuit, can utilize protection transistors to work with very high supply voltages. Operation of the startup circuit includes the following steps:

1) When a voltage supply first becomes present through resistor 505, a reference current is created by transistors 560A and 570A.
2) This reference current is mirrored to the first pair MOSFET 560B and MOSFET 570B, and to the second pair MOSFET 560C and MOSFET 570C.
3) Then the PTAT circuit 580, corresponding to PTAT current generator 403 in FIG. 4, starts up.
4) When the PTAT circuit 580 starts up, a reference current is generated at MOSFET pair 520C and MOSFET 525C.
5) This current is mirrored by MOSFET pair 520D and 525D, and copied by 510C.
6) Then MOSFET 510A and MOSFET 510B mirrors the current of MOSFET 510C and turns off MOSFET 560B and MOSFET 560C. In this way, the start-up circuit 500 is disabled once the main circuit starts.

Figure 6:
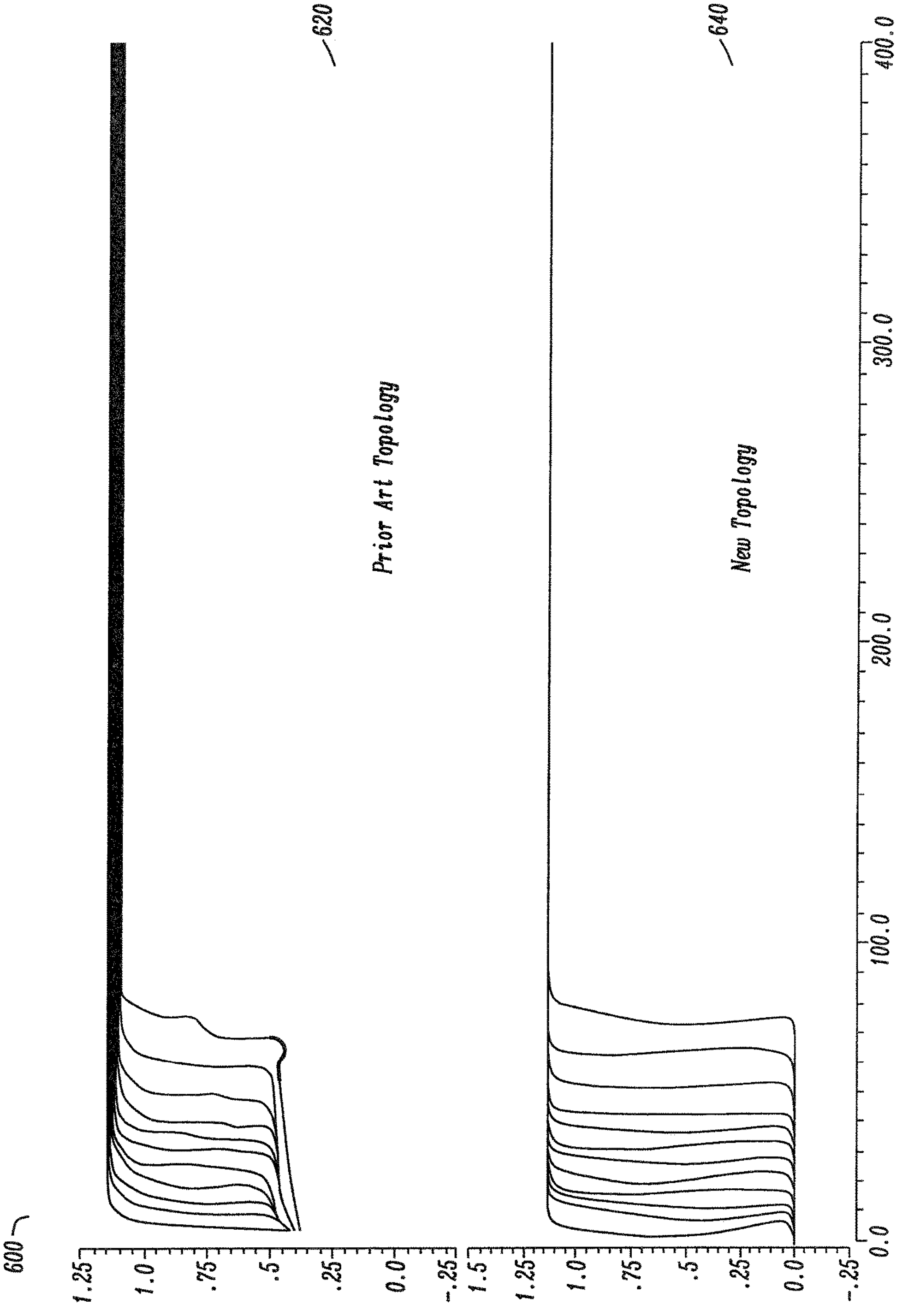
FIG. 6 is a comparison of transient voltage simulation of a bandgap output voltage a prior art voltage reference circuit and a bandgap voltage reference circuit in accordance with an embodiment of the disclosure.

FIG. 6 is a comparison of transient voltage simulation 600 of a prior art voltage reference circuit 620 and a bandgap voltage reference circuit 640 in accordance with an embodiment of the disclosure. In FIG. 6, it can be seen that the disclosed embodiment 640 quickly provides the reference voltage, and more importantly more smoothly and accurately for all corner cases. This provides faster settling for the rest of the circuit. The embodiment of the disclosure response 640 settles much more smoothly avoiding glitches and other possible problems. Also the steady state values of the reference voltage have much less variation over corners. The circuit provides lower variation once the circuit reaches a steady state, which is evident from the smaller spread in the lower curves as compared to the upper curves. Additionally, the startup curves are smoother.

Figure 7:
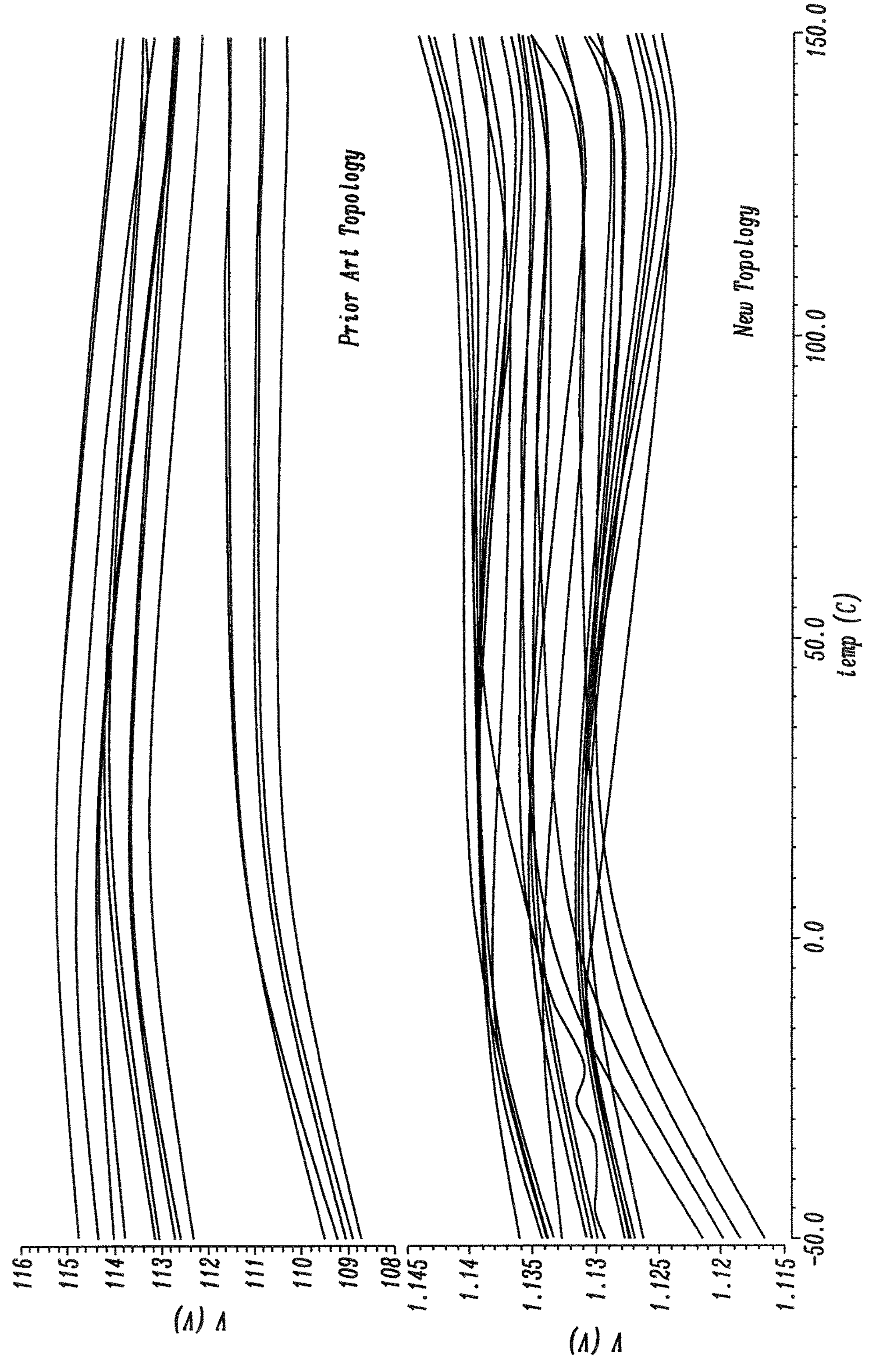
FIG. 7 is an expanded view comparison of bandgap output voltage simulation of a bandgap output voltage a prior art voltage reference circuit and a bandgap voltage reference circuit in accordance with an embodiment of the disclosure at 2.5V, 4V, and 24V input voltages.

FIG. 7 is an expanded view comparison of bandgap output voltage simulation 800 of a bandgap output voltage of a prior art voltage reference circuit 820 and a voltage reference circuit in accordance with an embodiment of the disclosure 840 at 2.5V, 4V, and 24V input voltages. FIG. 7 demonstrates operability of the embodiment in the disclosure demonstrating advantages of the present disclosure. The embodiment in the disclosure provides an advantage of a very accurate output results over different supply voltages and PVT corners in comparison to prior art embodiments. In FIG. 7, it can be seen that the embodiment of the disclosure result 840 provides two to three times less variation in comparison to the known art 820. Also, the embodiment in the disclosure has the ability to adjust its reference voltage which prior art reference circuits cannot achieve. In FIG. 6, and FIG. 7, the output voltage is set to the similar value of a regular bandgap reference circuit in order to compare their performances.

Figure 8:
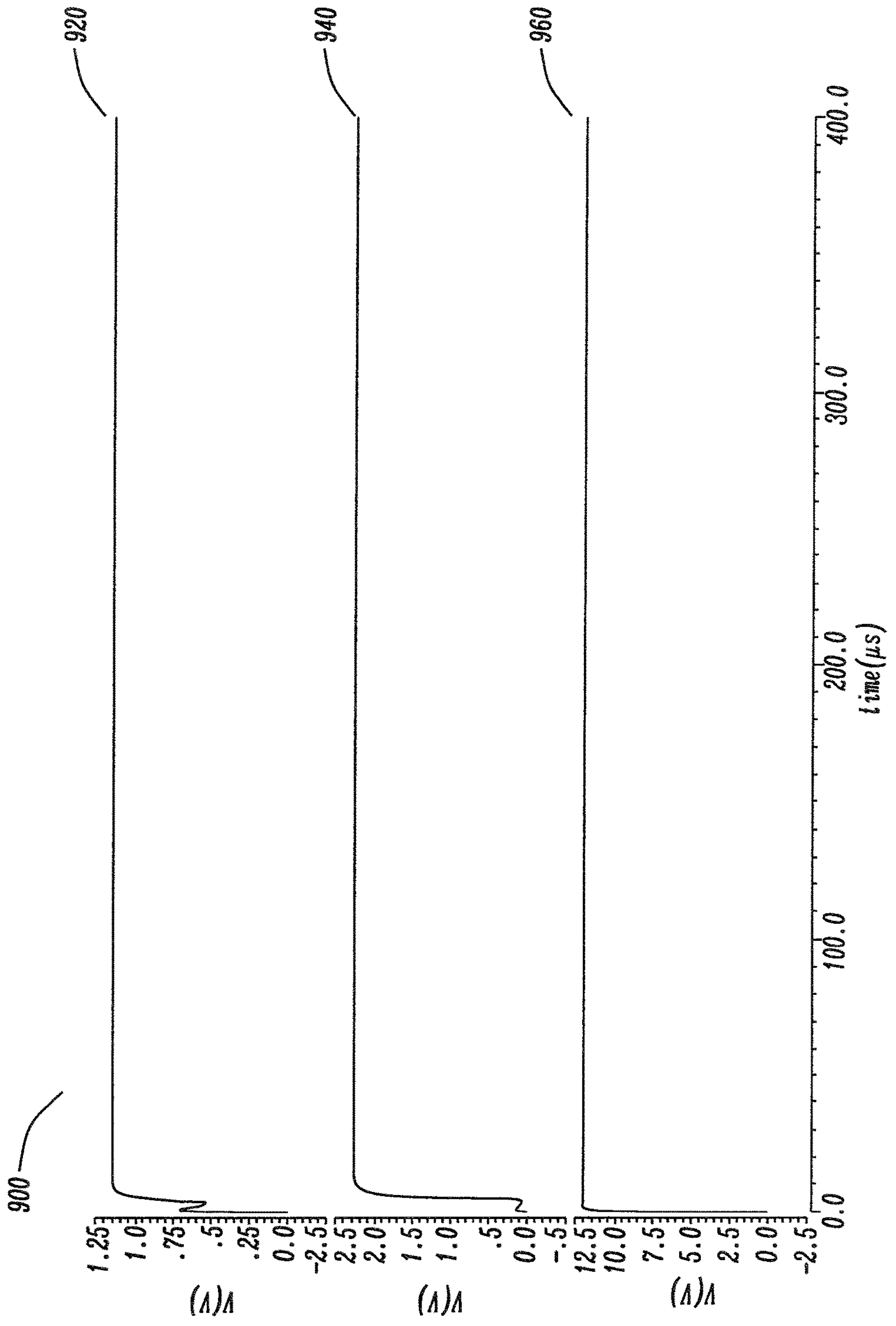
FIG. 8 is a comparison of bandgap output voltage simulation of a bandgap output voltage a prior art voltage reference circuit and a bandgap voltage reference circuit in accordance with an embodiment of the disclosure.

FIG. 8 is a comparison of bandgap output voltage simulation of a bandgap output voltage 900 of a prior art voltage reference circuit 920 and a voltage reference circuit in accordance with an embodiment of the disclosure 940, and input voltage 960. An advantage of the embodiment in this disclosure is to be able to provide an adjustable reference output. The results showing this advantage is observable in FIG. 8. Resistor values can be changed in the embodiment in this disclosure to provide a reference voltage, in this example, of around 2.27V. From FIG. 8, the smooth operation and the bandgap reference settling to the desired value can be seen clearly.

Figure 9:
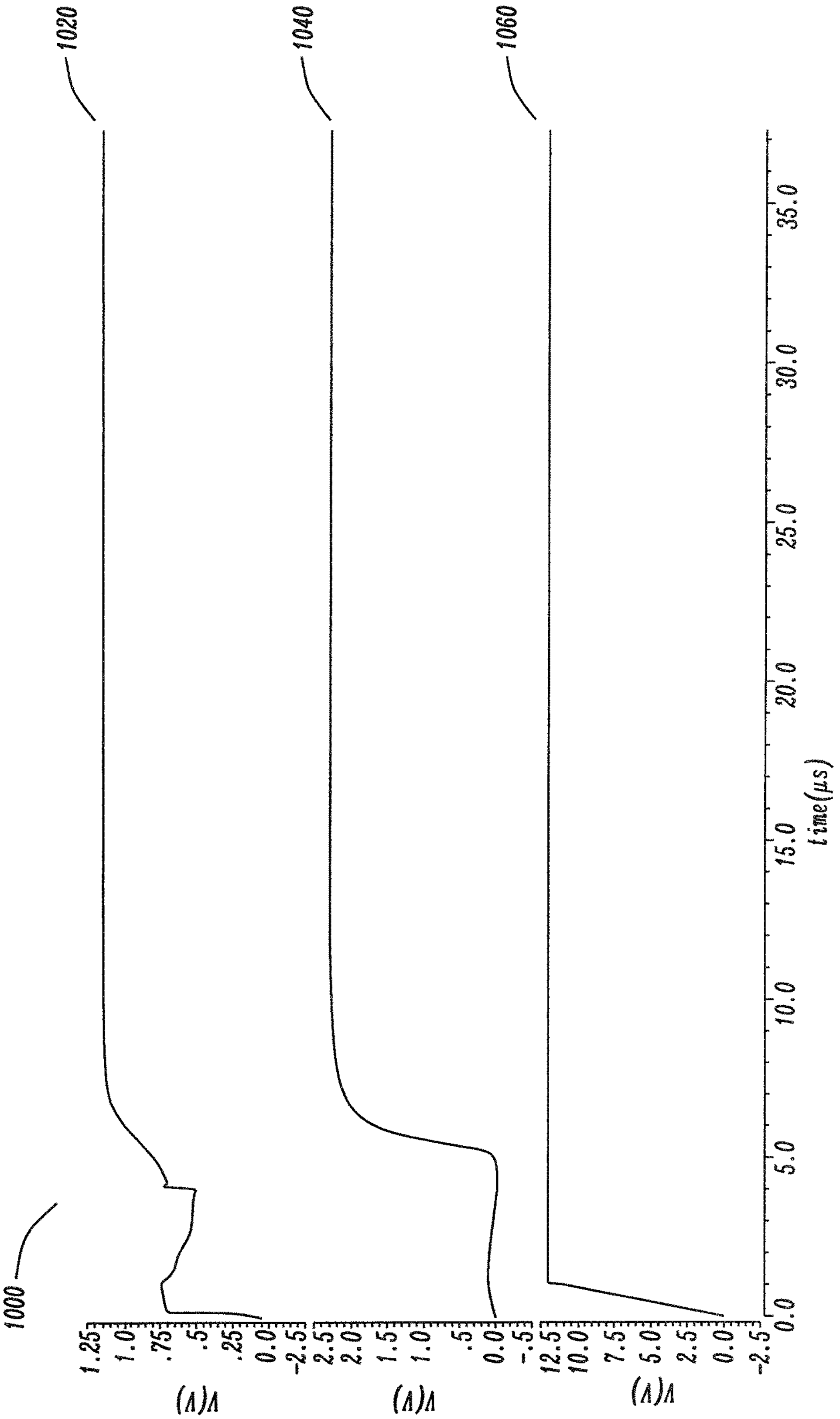
FIG. 9 is a comparison of bandgap output voltage simulation of a bandgap output voltage a prior art voltage reference circuit and a bandgap voltage reference circuit in accordance with an embodiment of the disclosure.

FIG. 9 is a comparison of bandgap output voltage simulation 1000 of a bandgap output voltage of a prior art voltage reference circuit 1020 and a voltage reference circuit in accordance with an embodiment of the disclosure 1040. FIG. 9 plots 100 is showing the earlier stage in more detail, as observable from signals 1020, 1040, and supply voltage 1060. The conventional bandgap voltage reference network 1020 suffers from a fluctuation at the startup that may trigger a bandgap ready comparator much earlier. In the embodiment in accordance with this disclosure, the reference voltage 1040 demonstrates a smooth operation, avoiding transient issues as observed in prior art implementation 1020.

Figure 10:
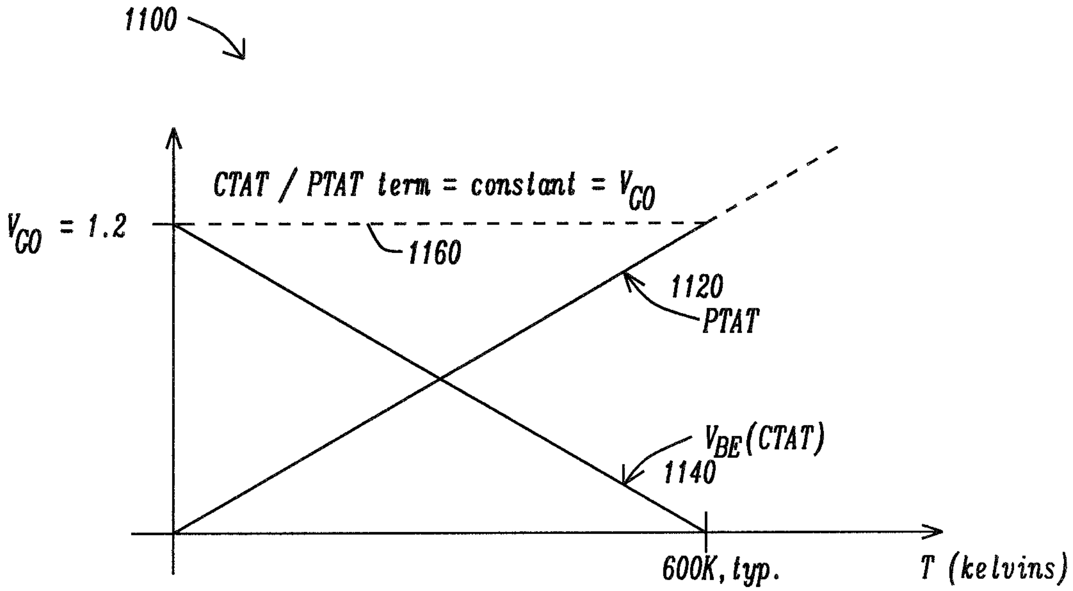
FIG. 10 is a plot of voltage versus temperature of base-emitter voltage as a function of CTAT, PTAT and summation; and, FIG. 11 is a method for providing a bandgap voltage reference circuit in accordance with an embodiment of the disclosure.

FIG. 10 is a plot of voltage versus temperature 1100 of voltage versus temperature of base-emitter voltage as a function of CTAT 1140, PTAT 1120 and summation 1600 The use of PTAT and CTAT currents can be utilized to generate a reference voltage The PTAT and CTAT currents are strongly related with each other and by setting a first one also fixes the other second one. In the embodiment in accordance with the disclosure, the PTAT and CTAT currents are independent of each other. Therefore, CTAT and PTAT currents have to be designed such that the reference voltage generated over $R_4$ is temperature independent as shown in FIG. 10. If the slopes of these currents are not carefully designed then the summed current may have temperature dependence. The slopes are dependent on the values of resistor R1 and R3 and can be adjusted, but this must be done in a way that the slopes are mutually adjusted.

Figure 11:
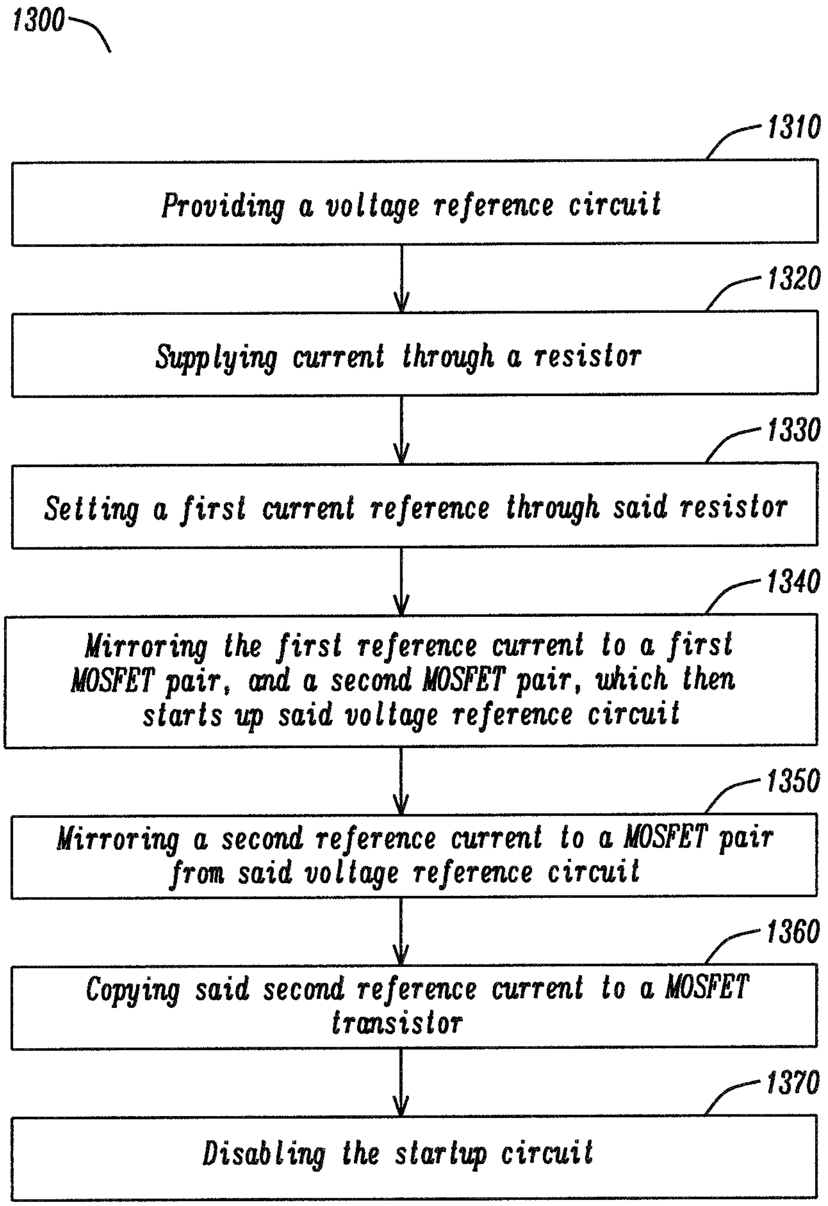

FIG. 11 depicts a method 1300 of initiating a voltage reference circuit, which includes a first step 1310 providing a voltage reference circuit, a second step 1320 supplying current through a resistor, a third step 1330 setting a first current reference through the resistor, a fourth step 1340 mirroring the first reference current to a first MOSFET pair and a second MOSFET pair, to start up the voltage reference circuit, a fifth step 1350 mirroring a second reference current to a third MOSFET pair from the voltage reference circuit, a sixth step 1360, copying the second reference current to a MOSFET transistor; and, a seventh step 1370 disabling the startup circuit.

The disclosure also includes a method for providing a reference voltage, including a first step, providing a PTAT current through a first resistor; a second step of providing a CTAT current through a second resistor; a third step, of summing the PTAT and CTAT currents to create a summed PTAT/CTAT current; and a fourth step of providing an output voltage greater than a silicon bandgap voltage by passing the summed PTAT/CTAT current through a third resistor.

It is recognized by those skilled in the art that the embodiments in this disclosure can be implemented with the substitution of n-channel as p-channel MOSFETs and p-channel MOSFETs as n-channel MOSFETs with the modifications in the power supply and ground connections. It is recognized by those skilled in the art that the embodiments in this disclosure can be implemented with the substitution of npn bipolar junction transistors (npn BJT) as pnp bipolar junction transistors (pnp BJT) MOSFETs, and vice versa, with the modifications in the power supply and ground connections. It is also understood by those skilled in the art that the following disclosure can be achieved using other types of high voltage devices, and field effect transistor structures, such as lateral diffused MOS (LDMOS). In advanced technologies, it is also understood that the embodiments can be formed using FINFET devices instead of planar MOSFETs.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A high voltage reference circuit configured to operate with a supply voltage up to 24 Volts, comprising:
- a proportional to absolute temperature (PTAT) Current Generator configured to provide a PTAT current through a first resistor;
- a complementary to absolute temperature (CTAT) Current Generator comprising a capacitor for compensation, configured to provide a CTAT current through a second resistor, wherein a first current mirror connection is established between the CTAT Current Generator, the PTAT Current Generator and a PTAT-CTAT Adder circuit, wherein the PTAT-CTAT Adder circuit is configured to sum said PTAT current and said CTAT current;
- a second current mirror connection is established between the CTAT Current Generator, the PTAT Current Generator and the PTAT-CTAT adder circuit, wherein the second current mirror connection comprises a plurality of transistors, and all the transistors of the second current mirror connection are high voltage p-channel (HP) transistors and the capacitor for compensation is connected to a HP transistor of the second current mirror connection in the CTAT Current generator and to a first terminal of the second resistor;
- wherein said sum of said currents generated by said PTAT Current Generator and said CTAT Current Generator flowing through a third resistor is configured to provide an output voltage greater than a silicon bandgap voltage and wherein the current generated by the PTAT Current Generator and the current generated by the CTAT Current Generator are separately generated so as to be separately adjusted as desired.

2. The circuit of claim 1 wherein said high voltage reference circuit further comprises a startup circuit configured to provide a signal to said PTAT Current Generator.

3. The circuit of claim 1, wherein said output voltage is variable, based on varying said third resistor.

4. The circuit of claim 3, wherein said third resistor is programmable.

5. The circuit of claim 1, wherein said first and second resistors are mutually adjusted to modify said PTAT and CTAT currents.

6. The circuit of claim 1, wherein said high voltage reference circuit, comprises high voltage n-channel (HN) transistors and high voltage p-channel (HP) transistors, thus enabling a supply voltage value of at up to 24 Volts.

7. The circuit of claim 1, wherein a supply voltage of a power supply rail VDD is greater than 2.5V.

8. The circuit of claim 1, wherein said output voltage is greater than the silicon bandgap voltage of 1.2 V.

9. The high voltage reference circuit of claim 1, wherein the first current mirror connection between the PTAT Current Generator, the CTAT Current Generator and the PTAT-CTAT adder circuit is formed by two p-channel MOSFETs of the PTAT Current Generator, one p-channel MOSFET of the CTAT Current Generator and one p-channel MOSFET of the PTAT-CTAT adder circuit, wherein the gates of all p-channel MOSFETs of the first current mirror connection are interconnected and the sources of all p-channel MOSFETs of the first current mirror connection are connected to the supply voltage and wherein the second current mirror connection between the PTAT Current Generator, the CTAT Current Generator and the PTAT-CTAT adder circuit is formed by two HP transistors of the PTAT Current Generator, one HP transistor of the CTAT Current Generator and one HP transistor of the PTAT-CTAT adder circuit, wherein the gates of all HP transistors of the second current mirror connection are interconnected and a source of a first HP transistor of the two HP transistors of the PTAT Current Generator is connected to a drain of a first p-channel MOSFET of the two MOSFETs of the PTAT current generator, a source of a second HP transistor of the two HP transistors of the PTAT Current Generator is connected to a drain of a second p-channel MOSFET of the two MOSFETs of the PTAT current generator, a source of the HP transistor of the CTAT Current Generator is connected to a drain of the p-channel MOSFET of the CTAT current generator and a source of the HP transistor of the PTAT-CTAT adder circuit is connected to a drain of the p-channel MOSFET of the PTAT-CTAT adder circuit.

10. A method for providing a reference voltage by a high voltage reference circuit, comprising the steps of:
- providing a proportional to absolute temperature (PTAT) current through a first resistor by a proportional to absolute temperature (PTAT) Current Generator;
- providing a complementary to absolute temperature (CTAT) current through a second resistor by a complementary to absolute temperature (CTAT) current generator comprising a capacitor for compensation, wherein a first current mirror connection is established between the PTAT Current Generator, the CTAT Current Generator and an PTAT-CTAT adder circuit;
- providing a second current mirror connection established between the CTAT Current Generator, the PTAT Current Generator and the PTAT-CTAT adder circuit, wherein the second current mirror connection comprises a plurality of transistors, and all the transistors of the second current mirror connection are high voltage p-channel (HP) transistors and the capacitor for compensation is connected to a HP transistor of the second current mirror connection in the CTAT Current generator and to a first terminal of the second resistor;
- summing said PTAT and said CTAT currents to create a summed PTAT/CTAT current;
- providing an output voltage greater than a silicon bandgap voltage by passing said summed PTAT/CTAT current through a third resistor; and
- further providing a startup circuit configured to provide a signal to said PTAT Current Generator.

11. The method of claim 10, wherein said output voltage is variable, based on varying said third resistor.

12. The method of claim 10, wherein said third resistor is programmable.

13. The method of claim 10, wherein said first and second resistors are mutually adjusted to modify said PTAT and CTAT currents.

14. The method of claim 10, wherein the high voltage reference circuit, configured to operate with a supply voltage of up to 24 Volt, comprising high voltage n-channel (HN) transistors and high voltage p-channel (HP) transistors, thus enabling a supply voltage value of up to 24 Volts.

15. The method of claim 10, wherein a supply voltage of a power supply rail VDD is greater than 2.5V.

16. The method of claim 10, wherein said output voltage is greater than 1.2 V.

* * * * *